United States Patent
Nakamura

(10) Patent No.: US 8,376,005 B2
(45) Date of Patent: Feb. 19, 2013

(54) PNEUMATIC TIRE

(75) Inventor: Norihiko Nakamura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 792 days.

(21) Appl. No.: 12/442,969

(22) PCT Filed: Aug. 7, 2007

(86) PCT No.: PCT/JP2007/065422
§ 371 (c)(1),
(2), (4) Date: Apr. 2, 2009

(87) PCT Pub. No.: WO2008/038462
PCT Pub. Date: Apr. 3, 2008

(65) Prior Publication Data
US 2009/0266456 A1    Oct. 29, 2009

(30) Foreign Application Priority Data
Sep. 27, 2006    (JP) .................................. 2006-263424

(51) Int. Cl.
*B60C 19/08*    (2006.01)
*B60C 1/00*    (2006.01)
*B60C 15/06*    (2006.01)

(52) U.S. Cl. ................ 152/152.1; 152/DIG. 2; 152/525; 152/543

(58) Field of Classification Search ................ 152/152.1, 152/DIG. 2, 543, 525; 156/130.7; *B60C 19/08*
See application file for complete search history.

(56) References Cited

U.S. PATENT DOCUMENTS
5,714,022 A * 2/1998 Nagao et al. .................. 152/525
(Continued)

FOREIGN PATENT DOCUMENTS
| CN | 1145862 | 3/1997 |
| CN | 1891508 | 1/2007 |

(Continued)

OTHER PUBLICATIONS
Chinese Office Action or Application No. 200780036274.4, dated Aug. 9, 2010, 9 pages.
(Continued)

*Primary Examiner* — Justin Fischer
*Assistant Examiner* — Philip N Schwartz
(74) *Attorney, Agent, or Firm* — Fish & Richardson P.C.

(57) ABSTRACT

A pneumatic tire that can be manufactured according to the conventional method without requiring special tire manufacturing steps and without needing addition of material members and production steps, has excellent rolling resistance and wet properties, and has conductivity. A pneumatic tire 10 has a side wall 16 contacted with a rim strip 19 of a bead part 11 and extended outward in a radial direction of a tire from the bead part 19 to be coupled to a ground contact edge region of a tread part 13, the side wall 16 comprising a two-layer structure of an internal layer rubber 27 and an outer layer rubber 26, characterized in that on the circumference of unilateral or bilateral part of the tire 10, the rim strip 19 and either the internal layer rubber 27 or the external layer rubber 26 of the side wall 16 are formed into a continuous conductive path by a conductive rubber material, only the conductive path is used as a conducting path of the tire, and members other than the conductive path are selected and used from a conductive rubber material or a nonconductive rubber material.

10 Claims, 5 Drawing Sheets

U.S. PATENT DOCUMENTS

| | | | |
|---|---|---|---|
| 5,898,047 A | 4/1999 | Howald et al. | |
| 5,937,926 A * | 8/1999 | Powell | 152/152.1 |
| 5,942,069 A | 8/1999 | Gerresheim et al. | |
| 6,070,630 A | 6/2000 | Pompei et al. | |
| 6,302,173 B1 | 10/2001 | Mizuno et al. | |
| 6,376,593 B1 | 4/2002 | Sasaka et al. | |
| 6,619,354 B1 | 9/2003 | Kobayashi et al. | |
| 6,742,559 B2 | 6/2004 | Iwamura | |
| 2002/0009608 A1 | 1/2002 | Nishikawa et al. | |
| 2003/0196738 A1 | 10/2003 | Kobayashi et al. | |
| 2004/0069386 A1 | 4/2004 | Janajreh et al. | |
| 2004/0173295 A1 | 9/2004 | Zanzig et al. | |
| 2005/0034801 A1 | 2/2005 | Matsunaga | |
| 2005/0103412 A1 * | 5/2005 | Zanzig et al. | 152/152.1 |
| 2005/0211362 A1 | 9/2005 | Hirayama | |
| 2006/0021687 A1 | 2/2006 | Dheur et al. | |
| 2006/0102264 A1 | 5/2006 | Nicolas | |
| 2007/0000585 A1 * | 1/2007 | Uchida et al. | 152/152.1 |
| 2007/0163690 A1 | 7/2007 | Nobuchika et al. | |
| 2007/0215257 A1 | 9/2007 | Uchida et al. | |
| 2007/0227636 A1 | 10/2007 | Mizuno et al. | |
| 2009/0308512 A1 | 12/2009 | Nakamura | |
| 2010/0078102 A1 | 4/2010 | Nakamura | |
| 2010/0078103 A1 | 4/2010 | Nakamura | |

FOREIGN PATENT DOCUMENTS

| | | |
|---|---|---|
| CN | 1990284 | 7/2007 |
| EP | 0 658 452 | 6/1995 |
| EP | 0 853 010 | 7/1998 |
| GB | 544757 | 4/1942 |
| JP | 61-015605 | 1/1986 |
| JP | 61-015606 | 1/1986 |
| JP | 08-216615 | 8/1996 |
| JP | 08-230407 | 9/1996 |
| JP | 09-030212 | 2/1997 |
| JP | 09-071112 | 3/1997 |
| JP | 11-217011 | 8/1999 |
| JP | 11-254924 | 9/1999 |
| JP | 2000-025425 | 1/2000 |
| JP | 2000-025428 | 1/2000 |
| JP | 2000-079805 | 3/2000 |
| JP | 2000-190709 | 7/2000 |
| JP | 2000-211323 | 8/2000 |
| JP | 2000-318408 | 11/2000 |
| JP | 2001-233994 | 8/2001 |
| JP | 2002-120514 | 4/2002 |
| JP | 2002-210843 | 7/2002 |
| JP | 2003-211913 | 7/2003 |
| JP | 2003-246888 | 9/2003 |
| JP | 2003-312213 | 11/2003 |
| JP | 2004-249537 | 9/2004 |
| JP | 2005-225985 | 8/2005 |
| JP | 2005-271857 | 10/2005 |
| JP | 2006-111767 | 4/2006 |

OTHER PUBLICATIONS

Chinese Office Action for Application No. 200780036274.4 dated Jun. 24, 2011.
Chinese Office Action for Application No. 200680056097.1 dated Oct. 12, 2010.
Notification of Reasons for Refusal for Application No. 2008-538527, dated May 10, 2011.
Office Action for U.S. Appl. No. 12/441,428 dated Oct. 7, 2011.
Office Action for U.S. Appl. No. 12/444,405 dated Oct. 12, 2011.
Office Action for U.S. Appl. No. 12/444,605 dated Jun. 10, 2011.
Chinese Office Action for Application No. 200680056097.1 dated Nov. 30, 2011 with English translation.
Office Action for U.S. Appl. No. 12/441,428 dated Aug. 1, 2012.
Final Office Action for U.S. Appl. No. 12/441,428 dated Mar. 29, 2012.
Final Office Action for U.S. Appl. No. 12/444,405 dated Mar. 29, 2012.
Final Office Action for U.S. Appl. No. 12/444,605 dated Apr. 13, 2012.
Chinese Office Action for Application No. 200680056097.1 dated Mar. 31, 2011 with English translation, correct date is Mar. 31, 2012.

* cited by examiner

PNEUMATIC TIRE

TECHNICAL FIELD

The present invention relates to a pneumatic tire. More particularly, the invention relates to a pneumatic tire manufactured by the conventional process, that has a tread of silica compounding or the like, improves rolling resistance and wet properties of a tire, and can discharge static electricity charged in vehicles to road surface.

BACKGROUND ART

To improve rolling resistance and running performance (wet properties) on wet road surface of a pneumatic tire, the technology of compounding silica with a rubber composition of a tread as a reinforcing agent in place of the conventional carbon black is known. With this silica compounding technology, static electricity charged in vehicles gives rise to the problems that discharge phenomenon is generated when a tire passes on manholes and the like, resulting in radio noise, adverse influence to electronic circuit parts, generation of short-circuit, and the like.

Conventionally, to solve those problems, the technology of providing a conductive member having carbon black compounded therein in a part of a tread structure, thereby securing conductivity of a tire is proposed. For example, the technology of Patent Document 1 below describes that a conductive thin film containing carbon black is arranged on the outer surfaces of a tread and a side wall, thereby discharging through this conductive layer. Furthermore, the technology of Patent Document 2 discloses that a conductive insert is provided on a tire crown part over from a tread surface to a bottom, and a conductive strip comprising a conductive material being in contact with this insert is in a contact state with a wheel in a conductive bead region, thereby discharging static electricity.

On the other hand, in recent years, many requirements for tires are demanded from the market. For example, improvement in rigidity to increase driving stability during high speed running, improvement in ride quality and in vibration absorption properties to reduce noise in vehicles, and the like, which are rubber properties in warring relationships, are required in a tread and a side wall. To satisfy those in a side wall part, a side wall rubber having a multilayer structure comprising two kinds or more of rubbers is proposed in, for example, Patent Documents 3 and 4, and is put into practical use.

Patent Document 1: JP-A-8-230407
Patent Document 2: JP-A-2006-143208
Patent Document 3: JP-A-2003-312213
Patent Document 4: JP-A-2000-25425

DISCLOSURE OF THE INVENTION

Problems that the Invention is to Solve

However, the technology of Patent Document 1 is that improvement effects in rolling resistance and wet properties of a tread by silica compounding are decreased by arranging the above-described conductive thin film containing carbon black, and it is difficult to sufficiently exhibit the original effect. Furthermore, from that the conductive thin film containing carbon black is arranged on the outer surfaces of a tread and a side wall, additional material members and process steps are required, and deterioration of productivity and increase in costs are predicted.

The technology of Patent Document 2 requires to separately providing conductive insert and strip. Therefore, the number of members is increased, and special process steps are required. Thus, it is difficult to say that such a tire has a structure that is easily produced, and decrease in productivity is predicted.

Furthermore, the multilayer structure side wall described in Patent Documents 3 and 4 has the object to combine ride quality and motion characteristics of a tire, such as braking performance, or to combine basic characteristics such as cut resistance and weather resistance of a side parts, and high value-added characteristics such as driving stability, fuel consumption and ride quality, and those documents do not describe to make nonconductive tires conductive.

In view of the above problems, the object of the invention is to provide a pneumatic tire having a two-layer structure side wall, that can be manufactured according to the conventional process without requiring special tire manufacturing steps and without needing addition of material members and process steps, has excellent rolling resistance and wet properties, and has conductivity.

Means for Solving the Problems

The invention described in claim 1 is a pneumatic tire comprising a side wall being in contact with a rim strip of a bead part, the side wall extending outward in a radial direction of the tire from the bead part and coupled to a ground contact edge region of the tread part, the side wall comprising a two-layer structure of an internal layer rubber and an external layer rubber, characterized in that on the circumference of unilateral or bilateral side parts of the tire, the rim strip, either the internal layer rubber or the external layer rubber of the side wall, and at least a surface part of the ground contact edge region are formed into a continuous conductive path by a conductive rubber material, only the conductive path is used as a conducting path of the tire, and members other than the conducting path are selected and used from a conductive rubber material or a nonconductive rubber material.

The invention claimed in claim 2 is the pneumatic tire as claimed in claim 1, characterized in that the external layer rubber of the side wall comprises a conductive rubber material, and the outward edge in a radial direction of the tire of the external layer rubber integrally forms the ground contact edge region.

The invention claimed in claim 3 is the pneumatic tire as claimed in claim 1, characterized in that the external layer rubber of the side wall comprises a conductive rubber material, and the tire has a wing disposed at both edges in an axial direction of the tire of the tread part and contacted with the outward edge in a radial direction of the tire of the external layer rubber to form the surface part of the ground contact edge region.

The invention claimed in claim 4 is the pneumatic tire as claimed in claim 1, characterized in that the internal layer rubber of the side wall comprises a conductive rubber material, and the outward edge in a radial direction of the tire of the internal layer rubber is exposed to the surface of the ground contact edge region of the tread part.

The invention claimed in claim 5 is the pneumatic tire as claimed in claim 1, characterized in that the internal layer rubber of the side wall comprises a conductive rubber material, and the tire has a wing disposed at both edges in an axial direction of the tire of the tread part and contacted with the outward edge in a radial direction of the tire of the internal layer rubber to form the surface part of the ground contact edge region.

The invention claimed in claim 6 is the pneumatic tire as claimed in any one of claims 1 to 5, characterized in that the conductive rubber material is a rubber composition having electric resistivity less than $10^8$ Ω·cm.

The invention claimed in claim 7 is the pneumatic tire as claimed in claim 6, characterized in that the rubber composition comprises a diene rubber as a rubber component, and carbon black having a nitrogen adsorption specific area of from 25 to 100 m$^2$/g in an amount of 14 vol % or more of the entire rubber composition.

The invention claimed in claim 8 is the pneumatic tire as claimed in claim 1, characterized in that the nonconductive rubber material comprises a rubber composition containing a non-carbon black reinforcing agent as a reinforcing agent.

The invention claimed in claim 9 is the pneumatic tire as claimed in claim 8, characterized in that the non-carbon black reinforcing agent is silica.

Advantage of the Invention

By applying a conductive rubber material to an external layer rubber or an internal layer rubber of a two-layer structure side wall and ensuring a conducting path, the pneumatic tire of the present invention can provide a tire having conductivity while additionally having excellent rolling resistance and wet properties due to silica compounding, that can be manufactured by the conventional process without requiring any special tire manufacturing step as disclosed in the prior art, and without needing addition of material members and process steps, and can eliminate problems such as noises, adverse influence to electronic parts, and short-circuit, due to static electricity charged in vehicles using a nonconductive tire of silica compounding or the like.

BEST MODE FOR CARRYING OUT THE INVENTION

The embodiments of the present invention are described below.

First Embodiment

FIG. 1 is a semi-sectional view showing a pneumatic tire 10 of a first embodiment.

The pneumatic tire (hereinafter, a pneumatic tire is simply referred to as a "tire") 10 comprises a pair of bead parts 11 to be mounted on a rim, a side wall part 16 extending outward in a radial direction of the tire from the bead part 11, and a tread part 13 ground-contacted to road surface laid between the side wall parts 16, 16, and the tread part 13 comprises a crown part 15 constituting a main ground contact part at the central portion in a width direction of the tire, and a shoulder part 17 positioned at both sides of the tread part 13 to form a ground contact edge region and being continuous to the side wall part 16.

The tire 10 has a rim strip 19 contacting with a flange of a rim provided outward in an axial direction of the tire of the bead part 11, and the lower edge of the side wall part 16 is contacted with the rim strip 19 by overlapping on the upper edge thereof.

The tire 10 has a side wall-on-tread (SWOT) structure in which the outward edge in a radial direction of the tire of the side wall part 16 is overlapped on the edge of a tread rubber 21, as shown in FIG. 1. Specifically, the outward edge of the side wall part 16 covers the surface of both peripheral parts of the tread part 13 on the circumference of the tire to form the shoulder part 17 constituting the tread ground contact edge region.

A side wall rubber provided in the side wall part 16 comprises a two-layer structure of an internal layer rubber 27 at a carcass 14 side and an external layer rubber 26 constituting the surface of the side wall part, and the outward edge in a radial direction of the tire of the external layer rubber 26 is extended to the shoulder part 17 to integrally form the ground contact edge region of the tread part 13.

Rubber compositions having different rubber characteristics are applied to the internal layer rubber 27 and the external layer rubber 26 of the side wall part 16, respectively, thereby, for example, simultaneously exhibiting the characteristics of two kinds of rubber and combining side wall characteristics that are in warring relationship.

The tire 10 shows a tire for passenger car having a radial structure having the carcass 14 in which two carcass plies comprising a cord provided in the radial direction around a bead core 12 embedded in each of a pair of the bead parts 11 are turned back outward from the inside of the tire and locked, a belt 18 comprising two crossed belt plies provided inward the tread part 13, and one cap ply 20 comprising a cord helically wound at an angle of nearly 0° to a circumferential direction of the tire, on the outer circumference of the belt 18.

An organic fiber cord such as polyester, nylon or rayon is used in a carcass ply of the carcass 14 as a reinforcing material, a rigid cord such as steel cord or aramide fiber is used in a belt ply of the belt 18 as a reinforcing material, and a cord having relatively large heat shrinkability such as nylon or polyester is used in a cap ply 20 as a reinforcing material.

A rubber composition using non-carbon black reinforcing agents such as silicas such as precipitated silica or silicic anhydride, clays such as calcined clay or hard clay, and calcium carbonate as a reinforcing agent in place of the conventional carbon black as a reinforcing agent is used in a tread rubber 21 of the crown part 15 constituting a main ground contact part of the tread part 13 so as to decrease tan δ of a rubber composition in order to contribute to the improvement of rolling resistance and wet properties of the tire 10. Silica having large improvement effect on rolling resistance and the like is particularly preferably used.

The compounding amount of the non-carbon black reinforcing agent such as silica varies depending on the kind of carbon black and the substitution amount, but is generally from 30 to 100 parts by weight, and preferably from 40 to 80 parts by weight, per 100 parts by weight of the rubber component.

In the case of silica, the kind of silica is not particularly limited. Wet silica having nitrogen adsorption specific area (BET) of from 100 to 250 m$^2$/g and DBP oil absorption of 100 ml/100 g or more is preferred in reinforcing effect and processability, and the commercially available products such as NIPSIL AQ and VN3, manufactured by Tosoh Silica Corporation, and ULTRASIL VN3, manufactured by Degussa can be used. Furthermore, the combination use of a silane coupling agent such as bis(triethoxysilylpropyl)-tetrasulfide is preferred.

As carbon black in the tread rubber 21, SAF, ISAF, HAF and the like are preferred in abrasion resistance and exothermic properties.

Diene rubbers such as natural rubber (NR), isoprene rubber (IR), styrene-butadiene rubber (SBR) and butadiene rubber (BR) are generally used as a rubber component in the rubber composition of the tread rubber 21. Those are used alone or as a blend rubber. Furthermore, oils of rubber compounding agent, softeners such as wax, stearic acid, zinc white, resins, age resistors, vulcanizing agents such as sulfur, vulcanization accelerators, and the like are appropriately compounded.

By this, the tread rubber 21 improves rolling resistance and wet properties, but on the other hand, the rubber composition has electric resistivity of $10^8$ Ω·cm or more, and forms a nonconductive rubber. As a result, the tread ground contact part is nonconductive, the tire 10 becomes a nonconductive tire having electric resistance of $10^9$Ω or more by the combination of each member, and static electricity charged in vehicles cannot be discharged to road surface from the tread part 13.

To solve the problem on static electricity charged in vehicles, the tire 10 of the present embodiment is that the strip rubber 23 of the rim strip 19 and the external layer rubber 26 of the side wall 19 are formed from a conductive rubber in the entire circumference of the tire in at least one side part of the tire.

By this, the rim strip rubber 23 and the external layer rubber 26 of the side wall 16 form a conductive path continuous to the ground contact edge region of the tread part 13.

The tire 10 uses only the conductive path as a conducting path, and static electricity of vehicles is discharged to road surface from the shoulder part 17 contacting with the road surface through the rim strip rubber 23 and the external layer rubber 26 of the side wall 16 from the rim.

The conductive rubber composition can easily be obtained by appropriately adjusting the compounding amount of carbon black, and it is desired that the rubber composition has electric resistivity preferably less than $10^7$ Ω·cm.

The conductive external layer rubber 26 contains diene rubbers such as NR, IR, SBR, BR or butadiene rubber (VCR) containing syndiotactic-1,2-polybutadiene, alone or as blends thereof, as a rubber component, and carbon black having nitrogen adsorption specific surface area ($N_2SA$) of from 25 to 100 m$^2$/g in an amount of 14 vol % or more of the entire rubber composition.

Where the amount of carbon black is less than 14 vol %, electric resistivity of the rubber composition is $10^8$ Ω·cm or more, resulting in deterioration of conductivity. Furthermore, where $N_2SA$ of carbon black is less than 25 m$^2$/g, durability is decreased due to decrease in strength of the rubber composition, and where $N_2SA$ exceeds 100 m$^2$/g, hysteresis loss is increased, resulting in increase in rolling resistance and generation of heat.

Carbon black having $N_2SA$ of from 25 to 100 m$^2$/g includes carbon blacks of HAF, FEF and GPF grades.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

On the other hand, a nonconductive rubber composition having compounded therewith a non-carbon black reinforcing agent such as silica as a reinforcing agent of a rubber composition in place of carbon black is used in the internal layer rubber 27 of the side wall 16, as in the tread rubber 21. The use can contribute to the improvement of rolling resistance and the like.

The nonconductive internal layer rubber 27 is obtained by changing only the compounding amount of carbon black in the conductive external layer rubber 26. That is, the nonconductive internal layer rubber is a rubber composition containing carbon black having $N_2SA$ of from 25 to 100 m$^2$/g in an amount less than 14 vol % of the entire rubber composition. Where the amount of carbon black is 14 vol % or more, the rubber composition has electric resistivity less than $10^8$ Ω·cm, and thus has conductivity. However, improvement effect on rolling resistance is not obtained.

Other than the purpose of reduction in rolling resistance or the like, rubber composition having the respective characteristics, such as a rubber composition having high rigidity which is effective in improvement of driving stability or a vibration dampening rubber composition which is effective in ride quality and reduction in noise, can appropriately be selected and used in the internal layer rubber 27 depending on the purpose of use of a tire. This rubber composition may be a rubber combining conductivity or non-conductivity.

The conductive rim strip rubber 23 contains diene rubbers such as NR, IR, SBR, BR or VCR alone or as blends thereof, as a rubber component, and carbon black having $N_2SA$ of from 70 to 100 m$^2$/g in an amount of 14 vol % or more of the entire rubber composition.

Where the amount of carbon black is less than 14 vol %, electric resistivity of the rubber composition is $10^8$ Ω·cm or more, resulting in deterioration of conductivity. Furthermore, where $N_2SA$ of carbon black is less than 70 m$^2$/g, the bead part is liable to be damaged due to rim rubbing by decrease in abrasion resistance of the rubber composition, and where $N_2SA$ exceeds 100 m$^2$/g, hysteresis loss deteriorates, resulting in increase in rolling resistance and generation of heat.

Carbon black having $N_2SA$ of from 70 to 100 m$^2$/g includes carbon black of HAF grade.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

In the case that a conductive rubber is applied to only one external layer rubber 26 of the side wall part 16, the conductive rubber is also applied to the rim strip rubber 23 at the same side. Needless to say, conductivity of a tire is secured by applying the conductive rubber to both the external layer rubber 26 of the side wall 19 and the rim strip rubber 23 at one side or both sides of the tire 10 in pairs.

Members other than the conducting path (that is, the rim strip rubber 23 and the external layer rubber 26 of the side wall) of the tire 10 can be selected from a conductive rubber material or a nonconductive rubber material so long as a conducting path is not formed.

For example, in the case that a conductive rubber is applied to the external layer rubber 26 at one side part of the tire 10, a nonconductive rubber having electric resistivity of $10^8$ Ω·cm or more can be applied to the internal layer rubber 27 and/or the external layer rubber 26 at other side part. Furthermore, a conductive rubber can also be applied.

In the case that a nonconductive rubber is applied to the internal layer rubber 27 and the external layer rubber 26 at other side part, rolling resistance and wet properties of the tire 10 can further be improved by the increase in the amount of the nonconductive rubber used. In this case, electric resistance of the tire 10 is slightly increased as compared with the case that the conductive external layer rubber 26 is applied to both side parts. However, discharge properties of static electricity are not greatly decreased, and there is no practical problem.

In the tire 10 shown in FIG. 1, the tread rubber 21 shows a tread of integrated structure. In the case that the tread part 13 has a cap/base structure, a nonconductive rubber is applied to a cap rubber from the standpoints of rolling resistance and wet properties. A base rubber can appropriately be selected from conductive and nonconductive rubbers. Other sites of the tire 10 such as topping rubber of a carcass or a belt, and bead filler can appropriately be selected from conductive and nonconductive rubbers so long as a conducting path is not formed. A nonconductive rubber is preferably selected from the standpoint of the improvement in rolling resistance and wet properties.

Second Embodiment

FIG. 2 is a semi-sectional view showing a pneumatic tire of a second embodiment.

The pneumatic tire 30 comprises a pair of bead parts 31 to be mounted on a rim, a side wall part 36 extending outward in radial direction of the tire from the bead part 31, and a tread part 33 ground-contacted to road surface laid between the side wall parts 36, 36, and the tread part 33 comprises a crown part 35 constituting a main ground contact part at the central portion in a width direction of the tire, and a shoulder part 37 positioned at both sides of the tread part 33 to form a ground contact edge region and being continuous to the side wall part 36.

The tire 30 has a rim strip 39 contacting with a flange of a rim arranged outward in a radial direction of the bead part 31, and the lower edge of the side wall part 36 is contacted with the rim strip 39 by overlapping on the upper edge thereof.

The tire 30 has a tread-over-side wall (TOS) structure in which the both edges of the tread part 33 are overlapped on the outward edge of the side wall part 36, as shown in FIG. 2.

A wing rubber 44 positioned at the shoulder part 37 constituting a ground contact edge region at both edges in an axial direction of the tire of the tread part 33 and contacted with the side wall part 36 to form the surface of the shoulder part 37 is provided on the circumference of the tire. That is, the wing rubber 44 is provided so as to contact with the edge of the tread rubber 41 and the upper edge of a side wall rubber in a bridged state.

The side wall rubber provided in the side wall part 36 comprises a two-layer structure of an internal layer rubber 47 at a carcass 34 side and an external layer rubber 46 constituting the surface of the side wall part, and the outward edge in a radial direction of the tire of the internal layer rubber 47 is extended to the shoulder part 37 to contact with the lower edge of the wing rubber 44 constituting the ground contact edge region of the tread part 33.

Rubber compositions having different rubber characteristics are applied to the internal layer rubber 47 and the external layer rubber 46 of the side wall part 36, respectively, thereby, for example, simultaneously exhibiting the characteristics of two kinds of rubber and combining side wall characteristics that are in warring relationship.

The tire 30 shows a tire for passenger car having a radial structure having the carcass 34 in which two carcass plies comprising a cord provided in the radial direction around a bead core 32 embedded in each of a pair of the bead parts 31 are turned back outward from the inside of the tire and locked, a belt 38 comprising two crossed belt plies provided inward the tread part 33, and one cap ply 40 comprising a cord helically wound at an angle of nearly 0° to the circumferential direction of the tire, on the outer circumference of the belt 38.

An organic fiber cord such as polyester, nylon or rayon is used in a carcass ply of the carcass 34 as a reinforcing material, a rigid cord such as steel cord or aramide fiber is used in a belt ply of the belt ply 38 as a reinforcing material, and a cord having relatively large heat shrinkability such as nylon or polyester is used in a cap ply 40 as a reinforcing material.

A rubber composition using non-carbon black reinforcing agents such as silica, clay and calcium carbonate as a reinforcing agent in place of the conventional carbon black as a reinforcing agent is used in a tread rubber 41 so as to decrease tan δ of a rubber composition in order to contribute to the improvement of rolling resistance and wet properties, similar to the tire 10. A rubber composition by the same formulation as in the tread rubber 21 described in the above first embodiment is used, and the rubber composition forms a nonconductive rubber having electric resistivity of $10^8$ Ω·cm or more.

As a result, the tread ground contact part is nonconductive, and the tire 30 becomes a nonconductive tire having electric resistance of $10^9$ Ω or more. As a result, static electricity charged in vehicles cannot be discharged to road surface from the tread part 33 through a rim strip rubber 43 of the bead part 31 and a side wall rubber of the side wall part 36 from the rim.

To solve the problem on static electricity charged in vehicles, the tire 30 of the present embodiment is that the strip rubber 43 of the rim strip 39, the external layer rubber 46 of the side wall 39 and the wing rubber 44 are formed by a conductive rubber on the circumference of the tire in at least one side part of the tire.

By this, through the rim strip rubber 43 and the external layer rubber 46 of the side wall 36, the wing rubber 44 forms a conductive path continuous to the ground contact edge region of the tread part 33.

The tire 30 uses only the conductive path as a conducting path, and static electricity of vehicles is discharged to road surface from the shoulder part 17 contacting with the road surface through the rim strip rubber 43, the external layer rubber 26 of the side wall 36 and the wing rubber 44 from the rim.

The conductive rubber composition can easily be obtained by appropriately adjusting the compounding amount of carbon black, and it is desired that the rubber composition has electric resistivity of preferably less than $10^7$ Ω·cm.

The conductive external layer rubber 46 can use the conductive rubber of the same formulation as in the first embodiment, and specifically is a rubber composition containing diene rubbers such as NR, IR, SBR, BR or VCR alone or as blends thereof, as a rubber component, and carbon black having $N_2SA$ of from 25 to 100 m²/g in an amount of 14 vol % or more of the entire rubber composition.

Where the amount of carbon black is less than 14 vol %, electric resistivity of the rubber composition is $10^8$ Ω·cm or more, resulting in deterioration of conductivity. Furthermore, where $N_2SA$ of carbon black is less than 25 m²/g, durability is decreased due to decrease in strength of the rubber composition, and where $N_2SA$ exceeds 100 m²/g, hysteresis loss is increased, resulting in increase in rolling resistance and generation of heat.

Carbon black having $N_2SA$ of from 25 to 100 m²/g includes carbon blacks of HAF, FEF and GPF grades.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

Members other than the conducting path (that is, the rim strip rubber 43, the external layer rubber 46 of the side wall 36 and the wing rubber 44) of the tire 30 can be selected from a conductive rubber material or a nonconductive rubber material so long as a conducting path is not formed.

For example, a nonconductive rubber composition having compounded therewith a non-carbon black reinforcing agent such as silica as a reinforcing agent of a rubber composition in place of carbon black is used in the internal layer rubber 47 of the side wall 36, as in the tread rubber 41. The use contributes to the improvement of rolling resistance and the like.

The nonconductive internal layer rubber 47 is obtained by changing only the compounding amount of carbon black in the conductive external layer rubber 46. That is, the nonconductive internal layer rubber is a rubber composition containing carbon black having $N_2SA$ of from 25 to 100 $m^2/g$ in an amount of less than 14 vol % of the entire rubber composition. Where the amount of carbon black is 14 vol % or more, the rubber composition has electric resistivity less than $10^8$ $\Omega \cdot cm$, and thus has conductivity. However, improvement effect on rolling resistance is not obtained.

Other than the purpose of reduction in rolling resistance or the like, rubber composition having the respective characteristics, such as a rubber composition having high rigidity which is effective in improvement of driving stability or a vibration dampening rubber composition which is effective in ride quality or reduction in noise, can appropriately be selected and used in the internal layer rubber 47 depending on the purpose of use of the tire. This rubber composition may be a rubber combining conductivity or non-conductivity.

The conductive rim strip rubber 43 can use a rubber composition containing diene rubbers such as NR, IR, SBR, BR or VCR alone or as blends thereof, as a rubber component, and carbon black having $N_2SA$ of from 70 to 100 $m^2/g$ in an amount of 14 vol % or more of the entire rubber composition, as same as in the first embodiment.

Where the amount of carbon black is less than 14 vol %, electric resistivity of the rubber composition is $10^8$ $\Omega \cdot cm$ or more, resulting in deterioration of conductivity. Furthermore, where $N_2SA$ of carbon black is less than 70 $m^2/g$, the bead part is liable to be damaged due to rim rubbing by decrease in abrasion resistance of the rubber composition, and where $N_2SA$ exceeds 100 $m^2/g$, hysteresis loss deteriorates, resulting in increase in rolling resistance and generation of heat.

Carbon black having $N_2SA$ of from 70 to 100 $m^2/g$ includes carbon black of HAF grade.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

The conductive wing rubber 44 can apply a rubber composition containing diene rubbers such as NR, IR, SBR, BR or VCR alone or as blends thereof, as a rubber component, and carbon black having $N_2SA$ of from 25 to 100 $m^2/g$ in an amount of 14 vol % or more of the entire rubber composition.

Where the amount of carbon black is less than 14 vol %, electric resistivity of the rubber composition is $10^8$ $\Omega \cdot cm$ or more, resulting in deterioration of conductivity. Furthermore, where $N_2SA$ of carbon black is less than 25 $m^2/g$, durability is decreased due to decrease in strength of the rubber composition, and where $N_2SA$ exceeds 100 $m^2/g$, hysteresis loss deteriorates, resulting in increase in rolling resistance and generation of heat.

Carbon black having $N_2SA$ of from 25 to 100 $m^2/g$ includes carbon blacks of HAF, FEF and GPF grades.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

The nonconductive wing rubber 44 is obtained by changing only the compounding amount of carbon black in the conductive wing rubber. That is, the nonconductive wing rubber is a rubber composition containing carbon black having $N_2SA$ of from 25 to 100 $m^2/g$ in an amount of less than 14 vol % of the entire rubber composition.

Where the amount of carbon black is 14 vol % or more, the rubber composition has electric resistivity less than $10^8$ $\Omega \cdot cm$, and thus has conductivity. However, improvement effect on rolling resistance is not sufficiently obtained.

In the case that a conductive rubber is applied to only one external layer rubber 46 of the side wall part 36, the conductive rubber is also applied to the rim strip rubber 43 at the same side. Needless to say, conductivity of a tire can be secured by applying the conductive rubber to the external layer rubber 36 of the side wall 39, the rim strip rubber 43 and the wing rubber 44 in pairs at one side or both side parts of the tire 30.

In the case that a conductive rubber is applied to the external layer rubber 47 at one side part of the tire 30, a nonconductive rubber having electric resistivity of $10^8$ $\Omega \cdot cm$ or more can be applied to the internal layer rubber 47 and/or the external layer rubber 46 at other side part. Furthermore, a conductive rubber can also be applied.

In the case that a nonconductive rubber is applied to the internal layer rubber 47 and the external layer rubber 46 at other side part, rolling resistance and wet properties of the tire 30 can further be improved by the increase in the amount of the nonconductive rubber used. In this case, electric resistance of the tire 30 is slightly increased as compared with the case that the conductive external layer rubber 47 is applied to both side parts. However, discharge properties of static electricity are not greatly decreased, and there is no practical problem.

In the tire 30 shown in FIG. 2, the tread rubber 41 shows a tread of integrated structure. In the case that the tread part 33 has a cap/base structure, a nonconductive rubber is applied to a cap rubber from the standpoints of rolling resistance and wet properties. A base rubber can appropriately be selected from a conductive or nonconductive rubber. Other sites of the tire 30 such as topping rubber of a carcass or a belt, and bead filler can appropriately be selected from conductive or nonconductive rubber so long as a conducting path is not formed. A nonconductive rubber is preferably selected from the standpoint of improvement in rolling resistance and wet properties.

Third Embodiment

FIG. 3 is a semi-sectional view showing a pneumatic tire 50 of a third embodiment.

The tire 50 of the present embodiment is an embodiment that in the two-layer structure side wall part 19 of the tire 10 described in the first embodiment above, the arrangement of the conductive rubber is changed from the external layer rubber 26 to the internal layer rubber 27.

That is, the tire 50 comprises a pair of bead parts 51 to be mounted on a rim, a side wall part 56 extending outward in a radial direction of the tire from the bead part 51, and a tread part 53 ground-contacted to road surface laid between the side wall parts 56, 56, and the tread part 53 comprises a crown part 55 constituting a main ground contact part at the central portion in a width direction of the tire, and a shoulder part 57 positioned at both sides of the tread part 53 to form a ground contact edge region and being continuous to the side wall part 56.

The tire 50 has a rim strip 59 contacting with a flange of a rim arranged outward in an axial direction of the bead part 51, and the lower edge of the side wall part 56 is contacted with the rim strip 59 by overlapping with the upper edge thereof.

The tire 50 has an SWOT structure in which the outward edge in a radial direction of the tire of the side wall part 56 is overlapped on the edge of a tread rubber 61, as shown in FIG. 3. Specifically, the outward edge of the side wall part 56 covers the surface of both peripheral parts of the tread part 53 on the circumference of the tire to form the shoulder part 57 constituting the tread ground contact edge region.

A side wall rubber provided in the side wall part 56 comprises a two-layer structure of an internal layer rubber 67 at a carcass 54 side and an external layer rubber 66 constituting the surface of the side wall part, and an outward edge 67a in a radial direction of the tire of the internal layer rubber 67 is extended to the shoulder part 57 and exposed to the surface of the ground contact edge region of the tread part 53.

Rubber compositions having different rubber characteristics are applied to the internal layer rubber 67 and the external layer rubber 66 of the side wall part 56, respectively, thereby, for example, simultaneously exhibiting the characteristics of two kinds of rubbers and combining side wall characteristics that are in warring relationship.

The tire 50 shows a tire for passenger car having a radial structure having the carcass 54 in which two carcass plies comprising a cord provided in a radial direction around a bead core 52 embedded in each of a pair of the bead parts 51 are turned back outward from the inside of the tire and locked, a belt 58 comprising two crossed belt plies provided inward the tread part 53, and one cap ply 60 comprising a cord helically wound at an angle of nearly 0° to the circumferential direction of the tire, on the outer circumference of the belt 58.

An organic fiber cord such as polyester, nylon or rayon is used in a carcass ply of the carcass 54 as a reinforcing material, a rigid cord such as steel cord or aramide fiber is used in a belt ply of the belt 58 as a reinforcing material, and a cord having relatively large heat shrinkability such as nylon or polyester is used in a cap ply 60 as a reinforcing material.

A rubber composition using non-carbon black reinforcing agents such as silicas such as precipitated silica or silicic anhydride, clays such as calcined clay or hard clay, and calcium carbonate as a reinforcing agent in place of the conventional carbon black as a reinforcing agent is used in a tread rubber 61 of the crown part 55 constituting a main ground contact part of the tread part 53 so as to decrease tan $\delta$ of a rubber composition in order to contribute to the improvement of rolling resistance and wet properties, similar to the tire 10. Silica having large improvement effect on rolling resistance and the like is particularly preferably used. The tread rubber 61 can use the same composition as used in the above-described tread rubber 21. Therefore, the description of the tread rubber 61 is omitted.

By this, the tread rubber 61 of the tire 50 improves rolling resistance and wet properties, but on the other hand, the rubber composition has electric resistivity of $10^8$ $\Omega \cdot cm$ or more, and forms a nonconductive rubber. As a result, the tread ground contact part is nonconductive, the tire 50 becomes a nonconductive tire having electric resistance of $10^9 \Omega$ or more by the combination of each member, and static electricity charged in vehicles cannot be discharged to road surface from the tread part 13.

To solve the problem on static electricity charged in vehicles, the tire 50 of the present embodiment is that the strip rubber 63 of the rim strip 59 and the internal layer rubber 67 of the side wall 56 are formed by a conductive rubber on the circumference of the tire in at least one side part of the tire.

By this, the rim strip rubber 63 and the internal layer rubber 67 of the side wall 56 form a conductive path continuous to the ground contact edge region of the tread part 53.

The tire 50 uses only the conductive path as a conducting path, and static electricity of vehicles is discharged to road surface from the shoulder part 17 contacting with the road surface through the rim strip rubber 63 and the internal layer rubber 67 of the side wall 56 from the rim.

The conductive rubber composition can easily be obtained by appropriately adjusting the compounding amount of carbon black, and it is desired that the rubber composition has electric resistivity of preferably less than $10^7$ $\Omega \cdot cm$.

The conductive internal layer rubber 67 can use the rubber composition having the same formulation as in the external layer rubber 26 above, and therefore, the description thereof is omitted in the present embodiment.

Members other than the conducting path (that is, the rim strip rubber 63 and the internal layer rubber 67 of the side wall) of the tire 50 can be selected from a conductive rubber material or a nonconductive rubber material so long as a conducting path is not formed.

For example, a nonconductive rubber composition having compounded therewith a non-carbon black reinforcing agent such as silica as a reinforcing agent of a rubber composition in place of carbon black is used in the external layer rubber 66 of the side wall 56, as in the tread rubber 61 above. The use contributes to the improvement of rolling resistance and the like.

The nonconductive external layer rubber 66 is obtained by changing only the compounding amount of carbon black in the conductive internal layer rubber 67. That is, the nonconductive external layer rubber is a rubber composition containing carbon black having $N_2SA$ of from 25 to 100 $m^2/g$ in an amount less than 14 vol % of the entire rubber composition. Where the amount of carbon black is 14 vol % or more, the rubber composition has electric resistivity less than $10^8$ $\Omega \cdot cm$, and thus has conductivity. However, improvement effect on rolling resistance is not obtained.

Other than the purpose of reduction in rolling resistance or the like, rubber composition having the respective characteristics, such as a rubber composition having high rigidity which is effective in improvement of driving stability or a vibration dampening rubber composition which is effective in ride quality or reduction in noise, can appropriately be selected and used in the external layer rubber 66. This rubber composition may be a rubber combining conductivity or nonconductivity.

The conductive rim strip rubber 63 can use the rubber composition by the same formulation as in the rim strip rubber 23 above. Therefore, the description is omitted in this embodiment.

In the case that a conductive rubber is applied to only one internal layer rubber 67 of the side wall part 56, the conductive rubber is also applied to the rim strip rubber 63 at the same side. Needless to say, conductivity of a tire is secured by applying the conductive rubber to the internal layer rubber 67 of the side wall 56 and the rim strip rubber 63 in pairs at one side or both side parts of the tire 50.

In the case that a conductive rubber is applied to the internal layer rubber 67 at one side part of the tire 50, a nonconductive rubber having electric resistivity of $10^8$ $\Omega \cdot cm$ or more can be applied to the internal layer rubber 67 and/or the external layer rubber 66 at other side part. Furthermore, a conductive rubber can also be applied.

In the case that a nonconductive rubber is applied to the internal layer rubber 67 and the external layer rubber 66 at other side part, rolling resistance and wet properties of the tire 50 can further be improved by the increase of the amount of the nonconductive rubber used. In this case, electric resistance of the tire 50 is slightly increased as compared with the case that the conductive internal layer rubber 67 is applied to both side parts. However, discharge properties of static electricity are not greatly decreased, and there is no practical problem.

In the tire 50 shown in FIG. 3, the tread rubber 61 shows a tread of integrated structure. In the case that the tread part 53 has a cap/base structure, a nonconductive rubber is applied to a cap rubber from the standpoints of rolling resistance and wet properties. A base rubber can appropriately be selected from conductive or nonconductive rubber. Other sites of the tire 50 such as topping rubber of a carcass or a belt, and bead filler can appropriately be selected from conductive or nonconductive rubber in a range of not forming conducting path. A nonconductive rubber is preferably selected from the standpoints of rolling resistance and wet properties.

Fourth Embodiment

FIG. 4 is a semi-sectional view showing a pneumatic tire 70 of a fourth embodiment.

The tire 70 of the present embodiment is an embodiment that in the two-layer structure side wall 36 of the tire 30 described in the second embodiment above, the arrangement of the conductive rubber is changed from the external layer rubber 46 to the internal layer rubber 47.

That is, the tire 70 comprises a pair of bead parts 71 to be mounted on a rim, a side wall part 76 extending outward in a radial direction of the tire from the bead part 71, and a tread part 73 ground-contacted to road surface laid between the side wall parts 76, 76, and the tread part 73 comprises a crown part 75 constituting a main ground contact part at the central portion in a width direction of the tire, and a shoulder part 77 positioned at both sides of the tread part 73 to form a ground contact edge region and being continuous to the side wall part 76.

The tire 70 has a rim strip 79 contacting with a flange of a rim arranged outward in a radial direction of the bead part 71, and the lower edge of the side wall part 76 is contacted with the rim strip 59 by overlapping with the edge thereof.

The tire 70 has a TOS structure in which both edges of the tread part 73 are overlapped on the outward edge of the side wall part 76.

A wing rubber 84 positioned at the shoulder part 77 constituting the ground contact edge region at both edges in an axial direction of the tire of the tread part 73 and contacted with the side wall part 76 to form the surface of the shoulder part 77 is arranged on the circumference of the tire. That is, the wing rubber 84 is arranged so as to contact with the edge of the tread rubber 81 and the upper edge of a side wall rubber in a bridged state.

The side wall rubber provided in the side wall part 76 comprises a two-layer structure of an internal layer rubber at a carcass 74 side and an external layer rubber 86 constituting the surface of the side wall part, and the outward edge in a radial direction of the tire of the internal layer rubber 87 is extended to the shoulder part 77, and its outward edge neighborhood 87a is contacted with the lower edge of the wing rubber 84 constituting the ground contact edge region of the tread part 73.

Rubber compositions having different rubber characteristics are applied to the internal layer rubber 87 and the external layer rubber 86 of the side wall part 76, respectively, thereby, for example, simultaneously exhibiting the characteristics of two kinds of rubbers and combining side wall characteristics that are in warring relationship.

The tire 70 shows a tire for passenger car having a radial structure having the carcass 74 in which two carcass plies comprising a cord provided in the radial direction around a bead core 72 embedded in each of a pair of the bead parts 71 are turned back outward from the inside of the tire and locked, a belt 78 comprising two crossed belt plies provided inward the tread part 73, and one cap ply 80 comprising a cord helically wound at an angle of nearly 0° to the circumferential direction of the tire, on the outer circumference of the belt 78.

An organic fiber cord such as polyester, nylon or rayon is used in a carcass ply of the carcass 74 as a reinforcing material, a rigid cord such as steel cord or aramide fiber is used in a belt ply of the belt 78 as a reinforcing material, and a cord having relatively large heat shrinkability such as nylon or polyester is used in a cap ply 80 as a reinforcing material.

A rubber composition using non-carbon black reinforcing agents such as silica, clay or calcium carbonate as a reinforcing agent in place of the conventional carbon black as a reinforcing agent is used in a tread rubber 81 of the crown part 75 constituting a main ground contact part of the tread part 73 so as to decrease tan δ of a rubber composition in order to contribute to the improvement of rolling resistance and wet properties, similar to the tire 30 above. The rubber composition by the same formulation as in the tread rubber 41 described in the second embodiment above is used, thereby forming a nonconductive rubber having electric resistivity of $10^8$ Ω·cm or more.

As a result, the tread ground contact part is nonconductive, the tire 70 becomes a nonconductive tire having electric resistance of $10^9$ Ω or more, and static electricity charged in vehicles cannot be discharged to road surface from the tread part 73 through the rim strip 83 of the bead part and a side wall rubber of the side wall part 76 from a rim.

To solve the problem on static electricity charged in vehicles, the tire 70 of the present embodiment is that the strip rubber 83 of the rim strip 79, the internal layer rubber 87 of the side wall 76 and the wing rubber 84 are formed by a conductive rubber on the circumference of the tire in at least one side part of the tire.

By this, through the rim strip rubber 83 and the internal layer rubber 87 of the side wall, the wing rubber 84 forms a conductive path continuous to the ground contact edge region of the tread part 73.

The tire 70 uses only the conductive path as a conducting path, and static electricity of vehicles is discharged to road surface by the shoulder part 77 contacting with the road surface through the rim strip rubber 83 and the internal layer rubber 87 of the side wall 76 from the rim.

The conductive rubber composition can easily be obtained by appropriately adjusting the compounding amount of carbon black, and it is desired that the rubber composition has electric resistivity of preferably less than $10^7$ Ω·cm.

The conductive internal layer rubber 87 can use a rubber composition having the same formulation as in the external layer rubber 46 of the second embodiment, and therefore, the description thereof is omitted in the present embodiment.

Members other than the conducting path (that is, the rim strip rubber 83, the internal layer rubber 87 of the side wall 76, and the wing rubber 84) of the tire 70 can be selected from a conductive rubber material or a nonconductive rubber material so long as a conducting path is not formed.

For example, a nonconductive rubber composition having compounded therewith a non-carbon black reinforcing agent such as silica as a reinforcing agent of a rubber composition in place of carbon black is used in the external layer rubber 86 of the side wall 76, as in the tread rubber 81 above. The use contributes to the improvement of rolling resistance and the like.

The nonconductive external layer rubber 86 is obtained by changing only the compounding amount of carbon black in the conductive internal layer rubber 87. That is, the nonconductive external layer rubber is a rubber composition containing carbon black having $N_2SA$ of from 25 to 100 $m^2/g$ in an amount less than 14 vol % of the entire rubber composition. Where the amount of carbon black is 14 vol % or more, the rubber composition has electric resistivity less than $10^8$ $\Omega \cdot cm$, and thus has conductivity. However, improvement effect on rolling resistance is not obtained.

Other than the purpose of reduction in rolling resistance or the like, rubber composition having the respective characteristics, such as a rubber composition having high rigidity which is effective in improvement of driving stability or a vibration dampening rubber composition which is effective in ride quality or reduction in noise, can appropriately be selected and used in the external layer rubber 86. This rubber composition may be a rubber combining conductivity or nonconductivity.

The conductive or nonconductive rim strip rubber 83 and the wing rubber 84 can use the rubber compositions for rim strip and wing by the same formulations as in the second embodiment. Therefore, the description is omitted in this embodiment.

In the case that a conductive rubber is applied to only one internal layer rubber 87 of the side wall part 76, the conductive rubber is also applied to the rim strip rubber 83 and the wing rubber 84 at the same side. Needless to say, conductivity of a tire can be secured by applying the conductive rubber to the internal layer rubber 87 of the side wall 76, the rim strip rubber 83 and the wing rubber 84 in pairs at one side or both side parts of the tire 70.

In the case that a conductive rubber is applied to the internal layer rubber 87 at one side part of the tire 70, a nonconductive rubber having electric resistivity of $10^8$ $\Omega \cdot cm$ or more can be applied to the internal layer rubber 87 and/or the external layer rubber 86 at other side. Furthermore, a conductive rubber can also be applied.

In the case that a nonconductive rubber is applied to the internal layer rubber 87 and the external layer rubber 86 at other side part, rolling resistance and wet properties of the tire 70 can further be improved by the increase of the amount of the nonconductive rubber used. In this case, electric resistance of the tire 70 is slightly increased as compared with the case that the conductive external layer rubber 87 is applied to both side parts. However, discharge properties of static electricity are not greatly decreased, and there is no practical problem.

In the tire 70 shown in FIG. 4, the tread rubber 81 shows a tread of integrated structure. In the case that the tread part 73 has a cap/base structure, a nonconductive rubber is applied to a cap rubber from the standpoints of rolling resistance and wet properties. A base rubber can appropriately be selected from conductive or nonconductive rubber. Other sites of the tire 70 such as topping rubber of a carcass or a belt, and bead filler can appropriately be selected from conductive or nonconductive rubber in a range of not forming conducting path. A nonconductive rubber is preferably selected from the standpoint of improvement in rolling resistance and wet properties.

Fifth Embodiment

A fifth embodiment is an embodiment that a formation method of a side wall part is changed, and the present embodiment is described using the sectional view of the tire 10 of FIG. 1.

The side wall rubber of the first to fourth embodiments is that a strip-shaped side wall rubber comprising a laminate of an internal layer rubber and an external layer rubber, obtained by extrusion molding a conductive or nonconductive rubber in a given sectional shape is adhered to both side parts at the time of fabricating a green tire.

In the present embodiment, a ribbon-shaped strip rubber continuously containing a conductive rubber having electric resistivity less than $10^8$ $\Omega \cdot cm$ in a longitudinal direction is continuously and helically wound in nearly circumferential direction of the side wall part 16 over an area of from the rim strip 19 of the bead part 11 to the ground contact edge region of the tread part 13 at the time of fabricating a green tire, thereby forming the conductive internal layer rubber 27 or the conductive external layer rubber 26, having a given sectional shape. This method is a fabricating method called a strip-build method.

The ribbon-shaped strip rubber may be that the whole strip comprises a conductive rubber, but a conductive rubber may continuously be contained in a part of a ribbon-shaped section comprising a nonconductive rubber in a longitudinal direction.

In the case of the latter, the conductive rubber part is contacted with the rim strip 19, and simultaneously exposed to the surface of the ground contact part in the shoulder part 17. By this, a conducting path in which a conductive rubber is spirally provided on the internal layer rubber 27 or the external layer rubber 26 of the side wall part 16 is formed, and static electricity of vehicles can be discharged to road surface through the strip rubber. In this case, a rubber composition that can contribute to the improvement of rolling resistance and the like can be used in a nonconductive rubber.

The double structure strip rubber is obtained by bonding ribbons comprising a conductive rubber and a nonconductive rubber. Furthermore, the double structure strip rubber can easily be obtained by a twin-screw extruder.

The strip-build method can also be applied to the tire 30 of a TOS structure as shown in FIG. 2, and the rim strip 19 and the wing rubber 44 can be formed by the strip-build method. Furthermore, this method can be applied to the formation of nonconductive internal layer rubber and external layer rubber using a strip rubber comprising a nonconductive rubber.

EXAMPLES

The present invention is specifically described based on the Examples, but the invention is not construed as being limited thereto.

Rubber compositions for rim strip and side wall were prepared by kneading a conductive rubber and a nonconductive rubber, in which the compounding amount of carbon black is adjusted, and a rubber composition for a tread by silica compounding according to the formulation (parts by weight) shown in Table 1 by the ordinary method using a Banbury mixer having a volume of 200 liters. Rubber components and compounding agents used are as follows. Vol % of carbon black is a calculated value from the compounding amount (parts by weight).

Natural rubber (NR): RSS #3, made in Thailand
Butadiene rubber (BR): BR150B, Ube Industries, Ltd.
Styrene-butadiene rubber (SBR): 1502, JSR Corporation Carbon black HAF for rim strip rubber: SEAST 3, Tokai Carbon Co., Ltd.
Carbon black FEF for side wall rubber: SEAST SO, Tokai Carbon Co., Ltd.
Carbon black ISAF for tread rubber: SEAST 6, Tokai Carbon Co., Ltd.
Silica: NIPSIL AQ, Tosoh Silica Corporation
Silane coupling agent: Si69, Degussa
Aroma oil: X-140, Japan Energy Corporation
Paraffin wax: OZOACE-0355, Nippon Seiro Co., Ltd.
Age resistor 6C: NOCRAC 6C, Ouchi Shinko Chemical Industrial Co., Ltd.
Stearic acid: RUNAX S-20, Kao Corporation
Zinc oxide: ZINC WHITE #1, Mitsui Mining & Smelting Co., Ltd.
Sulfur: 5% oil-treated powdery sulfur, Hosoi Chemical Industry Co., Ltd.
Vulcanization accelerator NS: NOCCELER NS-P, Ouchi Shinko Chemical Industry Co., Ltd.

Electric resistivity of each rubber composition was measured according to JIS K6911, and is shown in Table 1. The measurement conditions were voltage applied: 1,000V, temperature: 25° C., and humidity: 50%.

rim strip to a tread, thereby securing conductivity of a tire. Regarding a tread rubber, the tread rubber shown in Table 1 was commonly used in each tire.

Furthermore, one ply of a polyester cord of 1670 dtex/2 was commonly used as a carcass (count: 22/25 mm), two plies (cross angle: 45°) of a steel cord of 2+2×0.25 were commonly used as a belt (count: 18/25 mm), and one sheet structure of nylon 66 cord of 940 dtex/2 was commonly used as a cap ply (count: 28/25 mm).

Electric resistance of a tire was measured as follows. The tire 10 was mounted on a standard rim R (15×6JJ) with air pressure of 200 kPa, and the rim with the tire was attached to a FF type domestic car of 1,600 cc displacement. After running the car as trial run at 100 km per hour for 3 hours, the electric resistance was measured based on "Measurement procedures of electric resistance of tire under load" specified in WDK, Blatt 3, Germany. Specifically, as shown in FIG. 3, the tire 10 mounted on the rim was vertically ground-contacted on a copper plate 131 placed on a table plate 130 in an electrically insulated state under a load of 400 kg, and electric resistance between the central portion of the standard rim R and the copper plate 131 was measured using a resistance meter 132 of applied voltage of 1,000 V. At the time of

TABLE 1

|  |  | Rim strip | | Side wall | | Tread rubber |
|---|---|---|---|---|---|---|
|  |  | Conductive | Nonconductive | Conductive | Nonconductive | Nonconductive |
| Formulation | NR | 70 | 70 | 40 | 40 | 50 |
|  | BR | 30 | 30 | 60 | 60 |  |
|  | SBR |  |  |  |  | 50 |
|  | Carbon black | 70 | 30 | 50 | 30 |  |
|  | Silica |  |  |  |  | 60 |
|  | Silane coupling agent |  |  |  |  | 4 |
|  | Aroma oil | 3 | 3 | 10 | 10 | 20 |
|  | Wax | 1 | 1 | 1 | 1 | 3 |
|  | Age resistor | 2 | 2 | 2 | 2 | 2 |
|  | Stearic acid | 2 | 2 | 2 | 2 | 2 |
|  | Zinc oxide | 3 | 3 | 3 | 3 | 3 |
|  | Sulfur | 2 | 2 | 2 | 2 | 2 |
|  | Vulcanization accelerator | 1.5 | 1.5 | 1.5 | 1.5 | 1.5 |
|  | Carbon black (vol %) | 20 | 12 | 16 | 12 | 0 |
|  | Electric resistivity ($\Omega \cdot cm$) | $7 \times 10^6$ | $2 \times 10^{12}$ | $2 \times 10^7$ | $7 \times 10^{12}$ | $3 \times 10^{13}$ |

Radial tires (195/65R15 88S) of SWOT structure as shown in FIG. 1 in which the external layer rubber and the internal layer rubber of the two-layer structure side wall, and the rim strip rubber were changed to a conductive rubber (indicated by "o" in Table 2) or a nonconductive rubber (indicated by "x" in Table 2) were produced according to the combination shown in Table 2 using the rubber compositions obtained, and electric resistance and rolling resistance were measured by the following methods. Comparative Example 5 is that a conductive rubber sheet (electric resistivity=$2 \times 10^7$ $\Omega \cdot cm$) with carbon black compounding having a thickness of 0.2 mm and a width of 10 cm was adhered over an area of from a measurement, temperature is 25° C. and humidity is 50%. The results are shown in Table 2.

The rolling resistance was measured as follows. A tire was mounted on a standard rim with air pressure of 200 kPa, and rolling resistance under a load of 400 kg at 60 km per hour was measured using a uniaxial drum tester for measurement of rolling resistance. The result was indicated by an index as the value of Comparative Example 1 being 100. The larger value indicates that rolling resistance is higher and fuel consumption property is poorer. The results obtained are shown in Table 2.

TABLE 2

|  | Position of side | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Side external layer rubber | Serial side | o | o | x | x | x | o | o | x |
|  | Antiserial side | o | x | x | x | x | o | x | x |
| Side internal layer rubber | Serial side | x | x | o | x | x | o | o | x |
|  | Antiserial side | x | x | o | x | x | o | x | x |

TABLE 2-continued

| | Position of side | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Rim strip | Serial side | ○ | ○ | ○ | x | ○ | x | x | ○ |
| | Antiserial side | ○ | x | ○ | x | ○ | x | ○ | ○ |
| Other | | | | | | | | | *1 |
| Electric resistance ($10^6$ Ω) | | 1 | 3 | 1 | 10,000 or more | 10,000 or more | 10,000 or more | 10,000 or more | 2 |
| Rolling resistance (Index) | | 104 | 102 | 104 | 100 | 102 | 104 | 103 | 110 |

*1: Conductive rubber sheet was adhered to the surface of the side wall at both sides over an area of from a rim strip to a tread.

INDUSTRIAL APPLICABILITY

The pneumatic tire of the present invention can be used in various vehicles such as four-wheel cars such as passenger cars, and additionally two-wheel cars such as motorcycles, three-wheel cars, and five-wheel or more buses, trailers and industrial vehicles.

Figure 1:
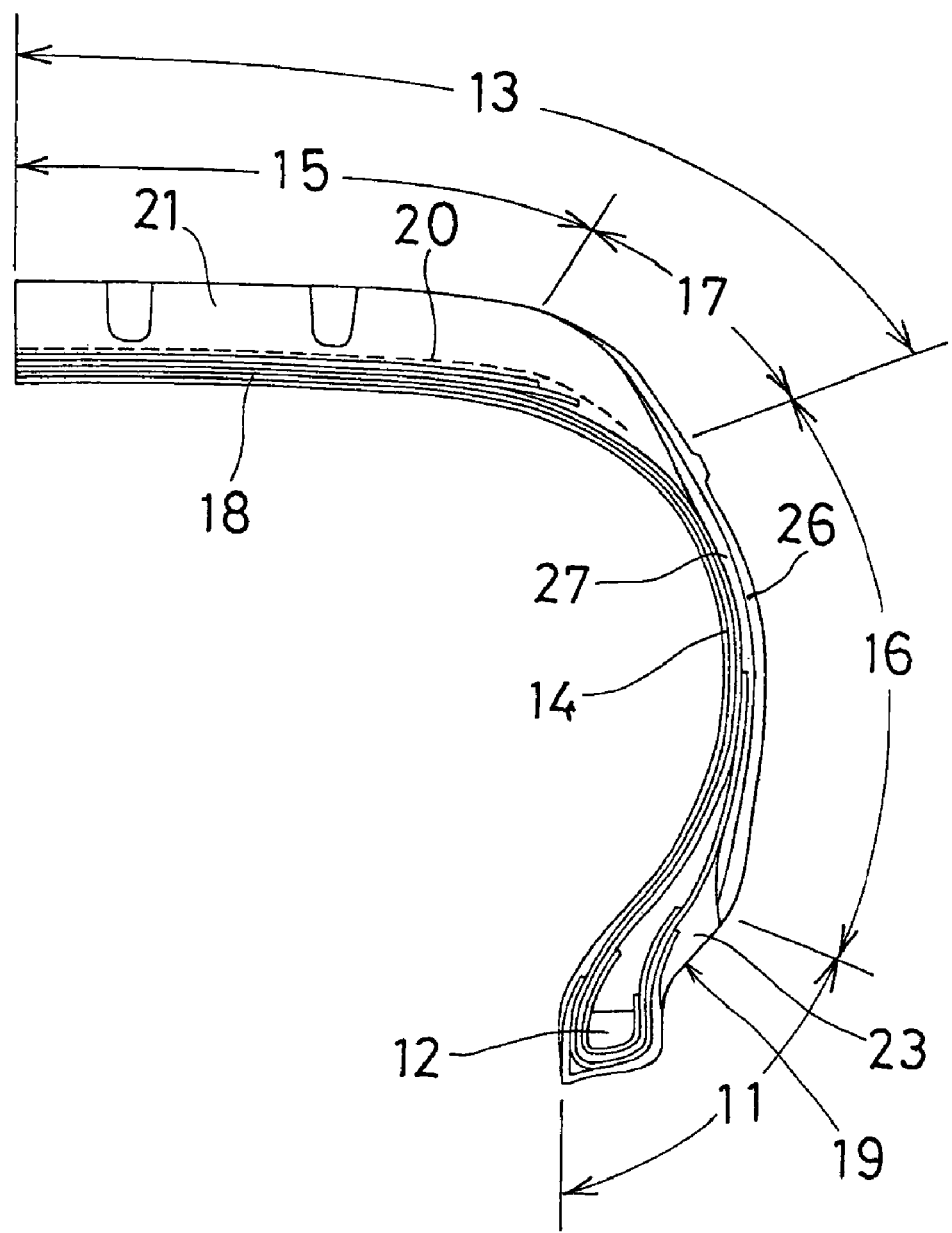
FIG. 1 is a semi-sectional view of a pneumatic tire of a first embodiment.
Figure 2:
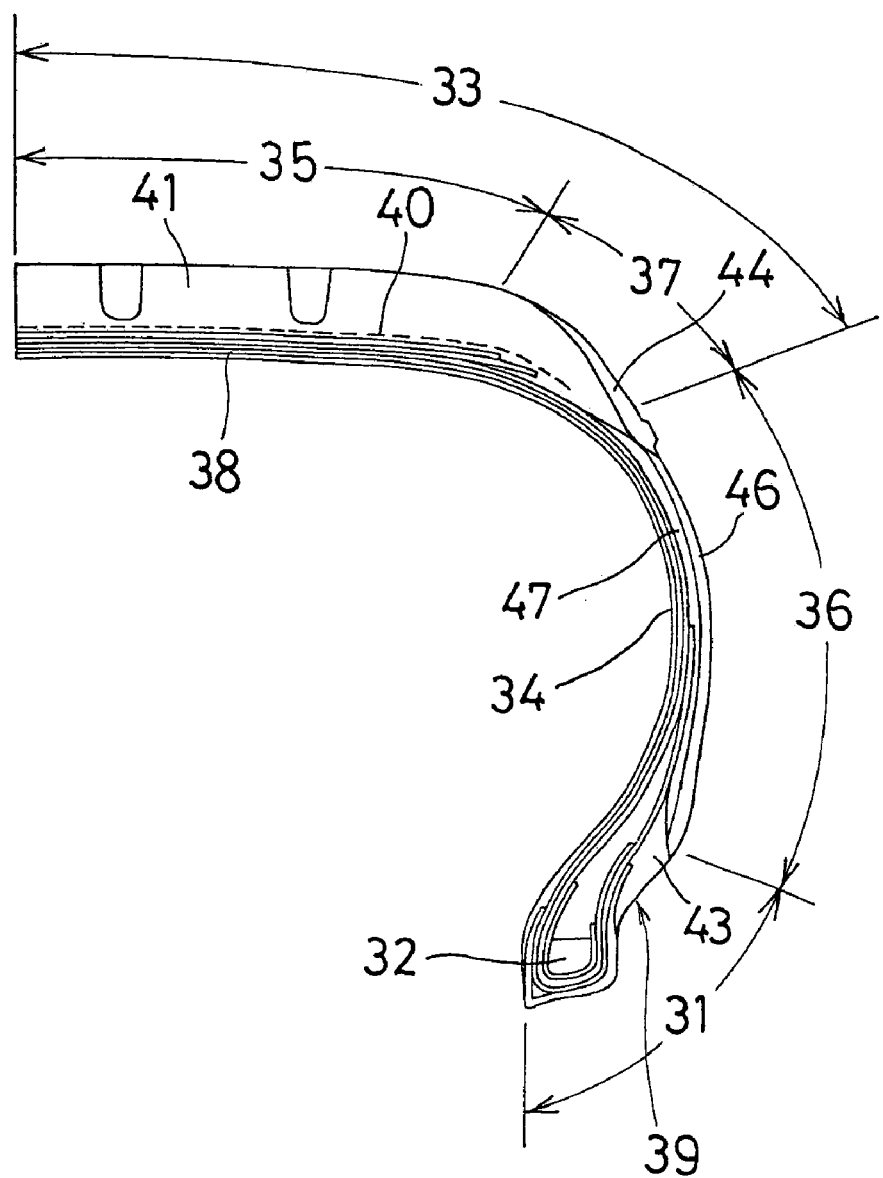
FIG. 2 is a semi-sectional view of a pneumatic tire of a second embodiment.
Figure 3:
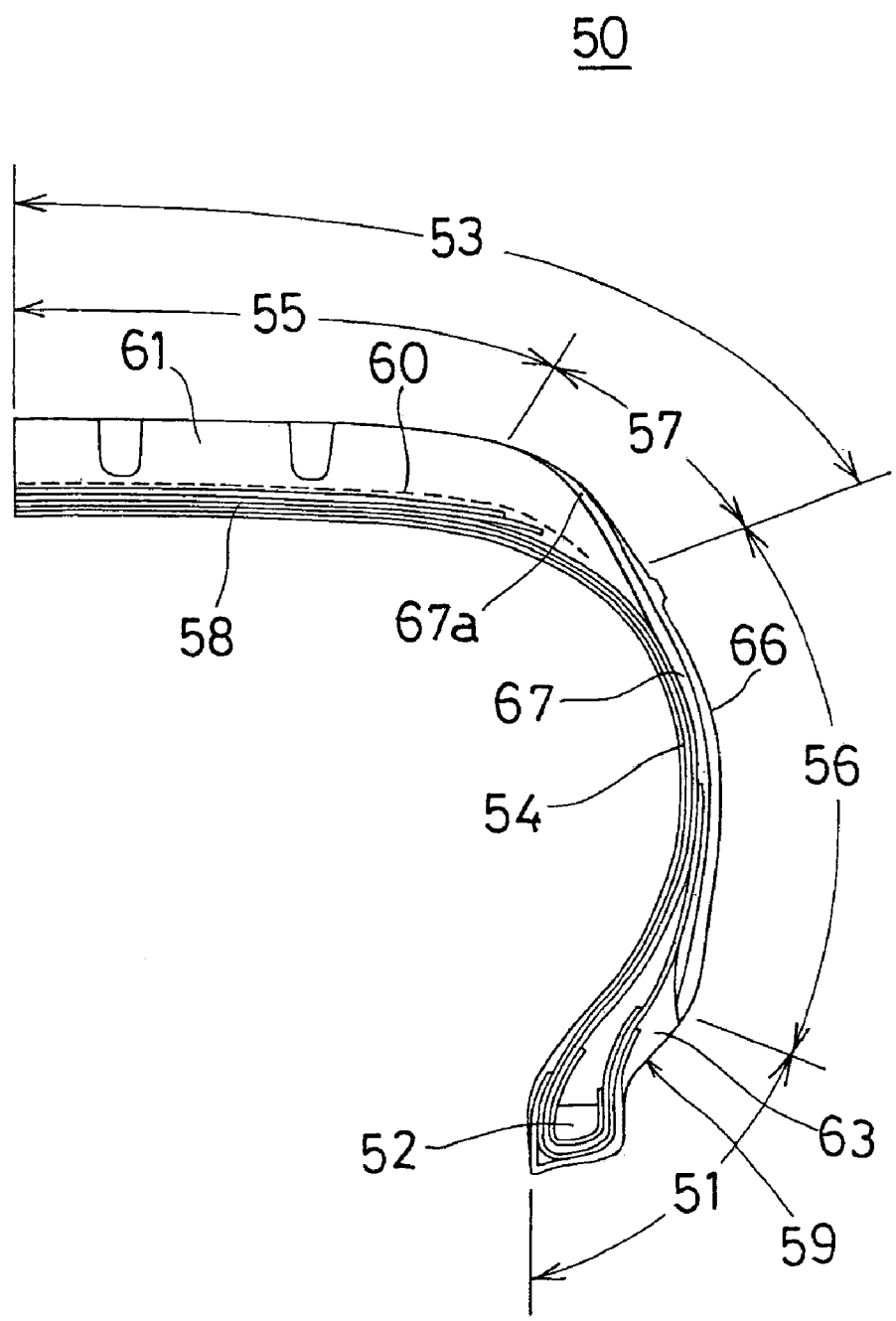
FIG. 3 is a semi-sectional view of a pneumatic tire of a third embodiment.
Figure 4:
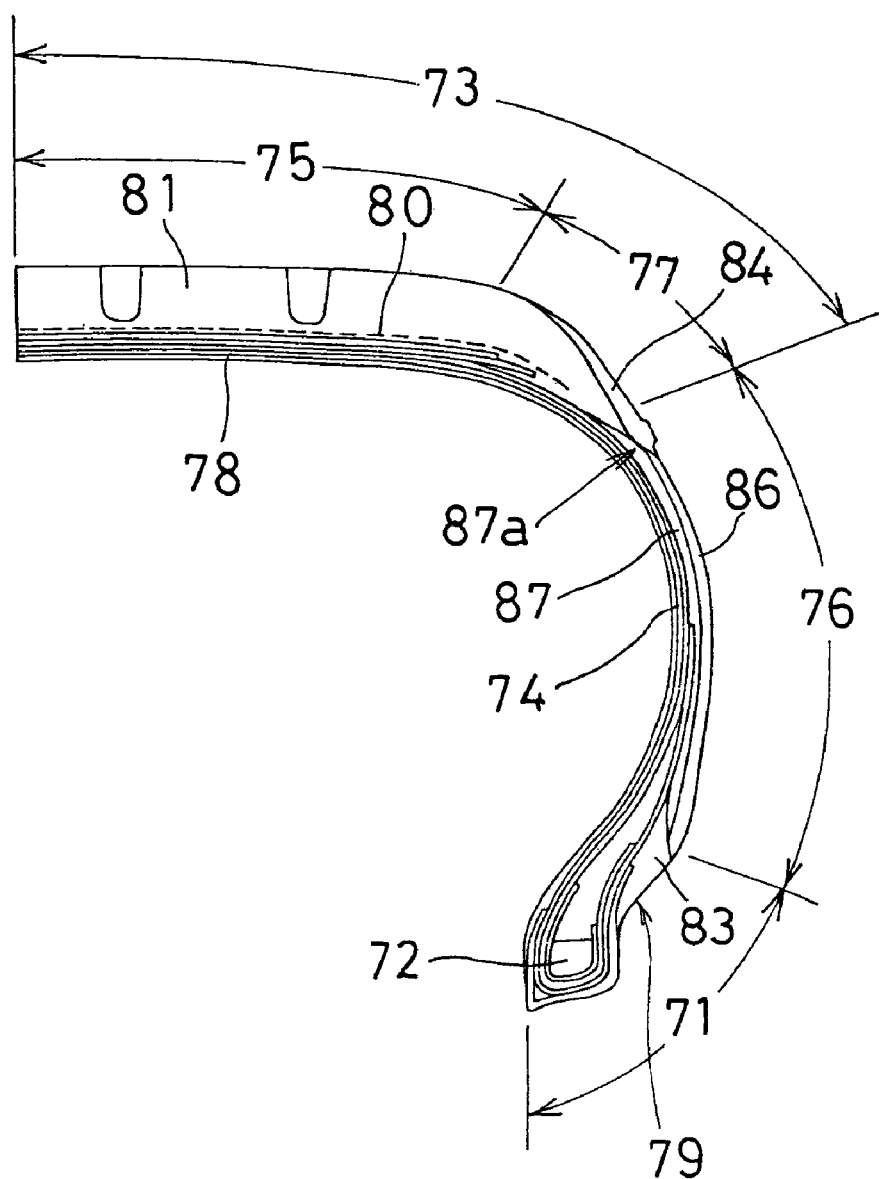
FIG. 4 is a semi-sectional view of a pneumatic tire of a fourth embodiment.
Figure 5:
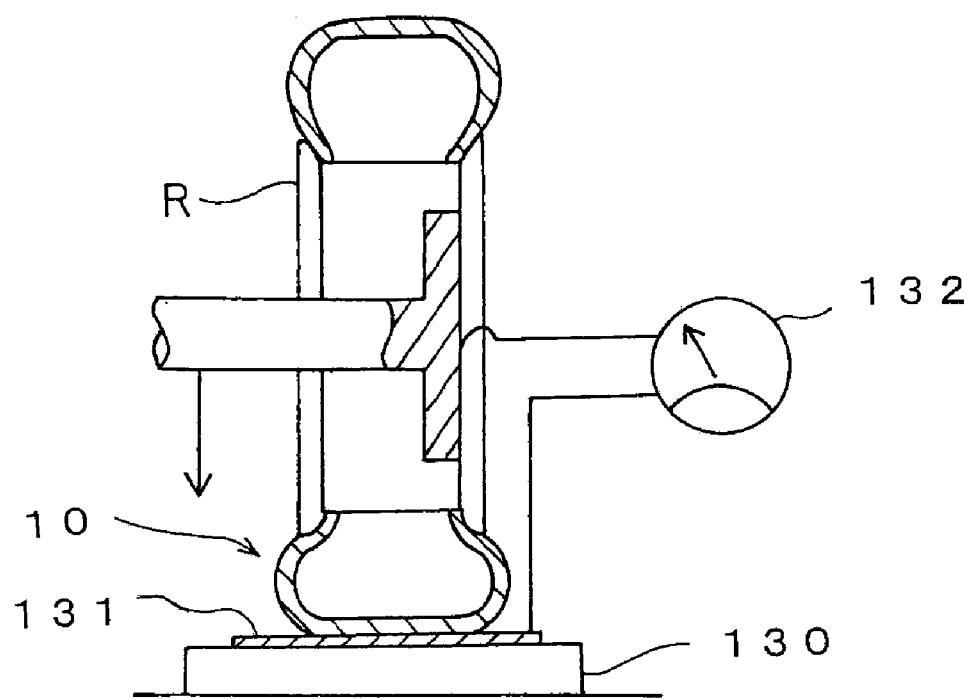
FIG. 5 is a schematic view showing a measurement method of electric resistance of a tire.

| Description of Reference Numerals and Signs | |
|---|---|
| 10 | Pneumatic tire |
| 11 | Bead part |
| 13 | Tread part |
| 16 | Side wall |
| 19 | Rim strip |
| 26 | External layer rubber |
| 27 | Internal layer rubber |

The invention claimed is:

1. A pneumatic tire comprising a side wall being in contact with a rim strip of a bead part, the side wall extending outward in a radial direction of the tire from the bead part and coupled to a ground contact edge region of the tread part, the side wall comprising a two-layer structure of an internal layer rubber and an external layer rubber;

wherein on the circumference of one of two side parts of the tire, the rim strip, either the internal layer rubber or the external layer rubber of the side wall, and at least a surface part of the ground contact edge region are formed into a continuous conductive path by a conductive rubber material, the other of the internal layer rubber or the external layer rubber in the one side part comprises a non-conductive rubber material, in the other of the two side parts of the tire both the internal layer rubber and the external layer rubber of the side wall comprise a nonconductive rubber material, only the conductive path is used as a conducting path of the tire, and members other than the conducting path are selected from a conductive rubber material or a nonconductive rubber material;

wherein the conductive rubber material is a rubber composition having electric resistivity less than $10^8$ Ω·cm; and wherein the rubber composition comprises a diene rubber as a rubber component, and carbon black having a nitrogen adsorption specific area of from 25 to 100 $m^2/g$ in an amount of 14 vol % or more of the entire rubber composition.

2. The pneumatic tire as claimed in claim 1, wherein the external layer rubber of the side wall comprises a conductive rubber material, and the outward edge in a radial direction of the tire of the external layer rubber integrally forms the ground contact edge region.

3. The pneumatic tire as claimed in claim 1, wherein the external layer rubber of the side wall comprises a conductive rubber material, and the tire has a wing disposed at both edges in an axial direction of the tire of the tread part and contacted with the outward edge in a radial direction of the tire of the external layer rubber to form the surface part of the ground contact edge region.

4. The pneumatic tire as claimed in claim 1, wherein the internal layer rubber of the side wall comprises a conductive rubber material, and the outward edge in a radial direction of the tire of the internal layer rubber is exposed to the surface of the ground contact edge region of the tread part.

5. The pneumatic tire as claimed in claim 1, wherein the internal layer rubber of the side wall comprises a conductive rubber material, and the tire has a wing disposed at both edges in an axial direction of the tire of the tread part and contacted with the outward edge in a radial direction of the tire of the internal layer rubber to form the surface part of the ground contact edge region.

6. The pneumatic tire as claimed in claim 1, wherein the nonconductive rubber material comprises a rubber composition containing a non-carbon black reinforcing agent as a reinforcing agent.

7. The pneumatic tire as claimed in claim 6, wherein the non-carbon black reinforcing agent is silica.

8. The pneumatic tire as claimed in claim 1, wherein in the one of the two side parts, the internal layer rubber and the external layer rubber are formed by rubber compositions containing the same rubber component.

9. The pneumatic tire as claimed in claim 1, wherein in the one of the two side parts, the internal layer rubber and the external layer rubber are formed by rubber compositions different only in amount of carbon black.

10. The pneumatic tire as claimed in claim 1, wherein the nonconductive rubber material is a rubber composition having electric resistivity of $10^8$ Ω·cm or more.

* * * * *